May 9, 1950

F. W. SCHNECK 2,507,384

SNAP-ACTION PILOT VALVE

Filed Jan. 11, 1946

INVENTOR.
F. W. SCHNECK
BY *E. W. Woodbury*
ATTORNEY

May 9, 1950  F. W. SCHNECK  2,507,384
SNAP-ACTION PILOT VALVE
Filed Jan. 11, 1946  2 Sheets-Sheet 2

INVENTOR.
F. W. SCHNECK
BY *E. Woodbury*
ATTORNEY

Patented May 9, 1950

2,507,384

UNITED STATES PATENT OFFICE 2,507,384

SNAP-ACTION PILOT VALVE

Frederick W. Schneck, Pacific Palisades, Calif., assignor to Bendix Aviation Corporation, South Bend, Ind., a corporation of Delaware Application January 11, 1946, Serial No. 640,466

6 Claims. (Cl. 137—144)

This invention relates to hydraulic valves of the pilot type and has particular application to pressure regulating valves for use in hydraulic power systems. The invention represents an improvement in pilot valves of the general type disclosed in the patent to W. C. Trautman, 2,320,763, issued June 1, 1943.

An object of the invention is to provide a pressure responsive pilot valve having a construction such that it opens and closes with a snap action.

Another object is to provide a pilot valve in which snap action on opening and closing is obtained without the use of special mechanical mechanisms.

Another object is to provide a pilot valve utilizing fluid pressure forces for producing a snap action on opening and closing.

Another object is to provide a pilot valve having snap action on opening and closing that is simple and reliable and retains its desired snap action operational characteristics irrespective of wear resulting from long service.

Another object is to provide a pilot valve having desirable operational characteristics that is relatively simple and inexpensive to manufacture.

Another object is to provide a practicable and inexpensive pressure regulating valve unit of pilot type.

Other more specific advantages and features of the invention will appear from the detailed description to follow which refers to the drawing.

Pressure regulating valves are commonly used in hydraulic power systems to maintain the pressure in the system between predetermined limits by connecting the output of the pump to the system when the system pressure drops below a predetermined lower limit and disconnecting the output of the pump from the system when the system pressure rises above a predetermined upper limit. Such a system is disclosed in the Trautman Patent 2,320,763, previously referred to. As shown in that patent, the output of the pump is connected through a check valve to the hydraulic system and is connected through a normally closed hydraulically actuated valve to the fluid reservoir, so that, when the latter valve opens, the pump can discharge directly back to the reservoir at low pressure and does not waste energy pumping fluid against a high head pressure. In the patent, the hydraulically actuated valve is controlled by a pilot valve which is responsive to the pressure in the system. The pilot valve construction disclosed in the patent has been used extensively but has the disadvantage that although it opens suddenly, it closes gradually. This causes a corresponding slow closing of the hydraulically actuated valve, which is less desirable than a faster action.

The present invention represents an improvement over the system of the Trautman patent in that the pilot valve inherently operates with a snap action in both its opening and closing movements. Furthermore, this snap action is obtained without the use of mechanical contrivances, by so designing the valve that when it starts to open the pressure force tending to open it is immediately increased, and when it begins to close the pressure force opposing the closing force is suddenly decreased. These variations in the pressure forces tending to open the pilot valve are obtained by making the controlling pressure effective over a larger piston area after the valve has started to open than before it opened, and decreasing the effective piston area to which the pressure fluid is applied when the valve begins to close.

The general construction and operation of a valve in accordance with the invention will first be described with reference to the schematic diagram of Fig. 6 and the graph of Fig. 7, after which an actual construction of the valve will be described with reference to Figs. 1 to 5, inclusive.

Figure 6:
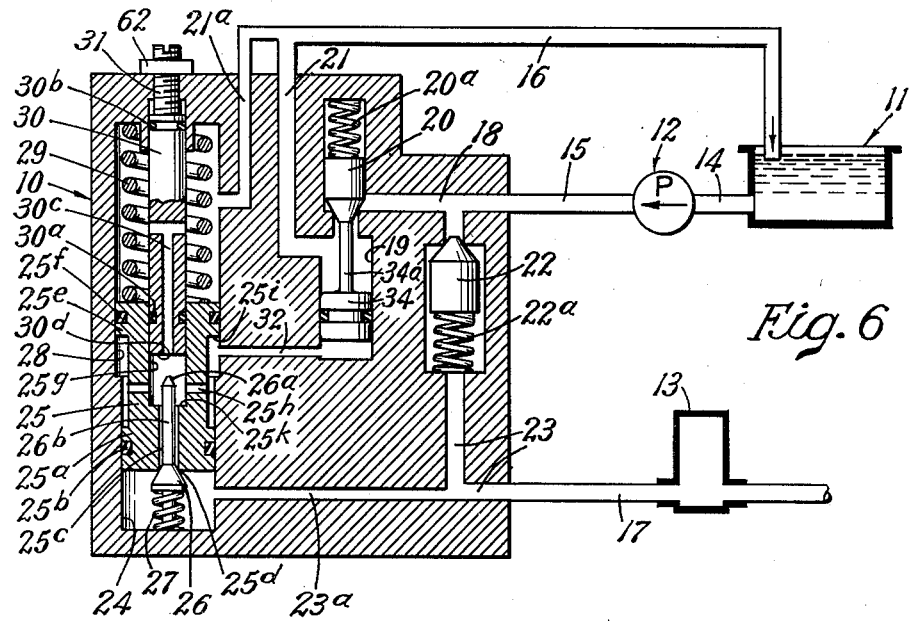
Fig. 6 is a schematic diagram showing the valve incorporated in a hydraulic system.

Referring to Fig. 6, there is shown a system including a valve 10, a fluid reservoir 11, a pump 12, and an accumulator 13. The pump 12 is adapted to pump fluid from the reservoir 11 through a conduit 14 and deliver it through a pump output conduit 15 to the valve 10. An exhaust conduit 16 extends from the valve 10 back to the reservoir 11, and a pressure conduit 17 extends from the valve 10 to the system to be supplied with pressure fluid, the accumulator 13 being floated on the pressure conduit 17. The accumulator 13 is not always employed, its function being merely to equalize pressure variations in the pressure conduit 17 and to maintain the pressure in the conduit for a longer period of time when the pump 12 is not supplying the demand.

The function of the regulator valve 10 is to maintain the pressure in the pressure conduit 17 between predetermined limits by connecting the pump output conduit 15 directly to the exhaust conduit 16 when the pressure in the conduit 17 exceeds a desired value and reconnecting the pump output 15 to the pressure conduit 17 when the pressure valve drops below a predetermined value. It is to be assumed that the pump 12 runs continuously during operation of the system.

As shown in Fig. 6 the regulator valve 10 is in condition for delivering thte fluid flow through the pump output conduit 15 to the pressure conduit 17. Thus the conduit 15 is connected to a valve passage 18, which in turn is connected by a check valve 22 with a valve passage 23 which is connected with the pressure conduit 17. The passage 18 may also be connected to the upper end of a cylinder 19 by a main poppet 20, and the upper end of the cylinder 19 is connected by a valve passage 21 to the exhaust conduit 16.

As shown in Fig. 6, the main poppet 20 is closed, so that the output of the pump 12 flows past the check valve 22 and through the passage 23 to the pressure conduit 17, gradually building up the pressure therein.

The pressure in the passage 23 is applied through a branch passage 23a to the lower end of a bore 24, containing a piston element 25 having a head 25a which is sealed with the bore 24 by a seal 25b. The piston element 25 has an axial passage 25c therein, the lower edge 25d of which constitutes a seat for a pilot poppet 26, which is lightly urged against the seat 25d by a helical compression spring 27.

The upper end of the bore 24 merges into the lower end of a bore 28 of slightly larger diameter, and the upper end portion 25e of the piston element 25 is sealed with respect to the bore 28 by a seal 25f. The piston element 25 is urged downwardly by a helical loading spring 29, which is compressed between the upper end of the piston element and the upper end of the bore 28. The upper end of the piston passage 25c merges into the lower end of a bore 25g in the piston element, and a normally stationary stem 30 projects into the bore 25g and is sealed with respect thereto by a seal 30a. A stem 30 is supported at its upper end from the body of the valve and is retained against upward movement by an adjustable stop 31, which is threaded into the valve body. A seal 30b prevents fluid leakage past the stem to the exterior of the body. The stem 30 has an axial passage 30c extending therein from its lower end and communicated at its upper end with the bore 28, which bore is in constant communication with the exhaust conduit 16 through a passage 21a. The lower end of the passage 30c constitutes a valve seat 30d adapted to be closed by an auxiliary poppet 26a formed on the upper end of a stem 26b on the pilot poppet 26. The lower end of the bore 25g in the piston element 25 is communicated by radial passages 25h with the lower end of the bore 28, which is communicated by a passage 32 with the lower end of the cylinder 19, which contains a piston 34, which is connected by a stem 34a to the main poppet 20.

As the pressure in the passage 23 rises, due to the delivery of fluid therethrough from the pump output conduit 15 past the check valve 22, this pressure is applied through the passage 23a to the lower end of the bore 24 and is effective against the lower end of the piston element 25 and the pilot poppet 26, to urge them upwardly against the force of the loading spring 29. When the pressure reaches a predetermined value determined by the strength of the spring 29 and the position of the stationary stem 30, the auxiliary poppet 26a seats against the seat 30d, thereby breaking connection between the lower end of the cylinder 19 and the exhaust passage 21. Previous to this time, the piston 34 was exposed to exhaust pressure on both sides, and the main poppet 20 was maintained closed by its spring 20a. The closure of the auxiliary poppet 26a on the seat 30d does not immediately change the pressure in the lower end of the cylinder 19, but it does prevent further upward movement of the pilot poppet 26. The fluid pressure acting against the pilot poppet 26 is no longer effective to urge the piston element 25 upwardly, and the latter remains stationary until the pressure in the passage 23a rises to a higher value such that the force created by this pressure against the annular lower end of the piston element 25 is sufficient to alone overcome the spring 29. Thereupon, the seat 25d is cracked away from the pilot poppet 26, permitting pressure fluid to flow upwardly through the passage 25c, the passages 25h and the passage 32, to the lower end of the cylinder 19, starting movement of the piston 34 upwardly to open the main poppet 20. Following cracking of the seat 25d away from the pilot poppet 26, the piston element 25 is moved rapidly upwardly to produce a wide opening between the pilot poppet 26 and the seat 25d, because of the fact that the pressure fluid admitted through the radial passages 25h to the lower end of the bore 28 is effective against the annular face 25i of the large head portion 25e of the piston element, the diameter of which is larger than that of the lower head portion 25a of the piston element. Hence, as soon as the seat 25d is cracked away from the pilot poppet 26, an additional upward force is applied to the piston element, this upward force being proportional to the difference between the areas of the bores 24 and 28, respectively.

The sudden upward movement of the piston element 25 and consequent large opening between the pilot poppet 26 and its seat 25d produces a sudden rush of pressure fluid through passage 32 into the lower end of the cylinder 19, which suddenly opens the main poppet 20 wide. Thereafter, the output of the pump 12 flows directly through the passage 18 past the poppet 20 and through the exhaust passage 21 and the exhaust conduit 16 back to the reservoir, so that the load is removed from the pump.

Assuming that fluid is being withdrawn by the system from the pressure conduit 17, the pressure therein and in the lower end of the bore 24 will gradually drop, following opening of the main poppet 20, and the piston element 25 is gradually returned to its lower position by the loading spring 29. Eventually, this return movement carries the seat 25d against the pilot poppet 26, thereby breaking the connection between the passage 23a and the passage 32 leading to the lower end of the cylinder 19. However, pressure fluid is trapped in the passage 25c, bore 25g, passages 25h, the passage 32, and the lower end of cylinder 19, so that the piston 34 still holds the main poppet 20 open. Further downward movement of the piston element 25 following contact of the seat 25d with the pilot poppet 26 is temporarily interrupted by virtue of the fact that the force of the pressure fluid in the lower end of the bore 24 against the pilot poppet 26 then becomes effective against the piston element 25. However, when the pressure in the pressure conduit 17, passages 23, 23a, and the lower end of bore 24 reaches a lower predetermined value, the spring 29 is effective to move the piston element 25 and the pilot poppet 26 downwardly, carrying the auxiliary poppet 26a clear of the seat 30d. Thereafter, the piston element 25 is moved suddenly, or snapped, into its full lower position, because the opening of the auxiliary poppet 26a away from the seat 30d releases the pressure fluid that was trapped in the lower end of the bore 28 and which was effective against the piston face 25i. The pressure in the passage 32 and the lower end of the cylinder 19 is therefore suddenly released, permitting the spring 20a to close the main poppet 20 and force the fluid delivered by the pump through output conduit 15 past the check valve 22 into the pressure conduit 17. The cycle of operations described will then be repeated when the pressure in the pressure conduit 17 again rises to a value sufficient to crack the valve seat 25d away from the pilot poppet 26.

Figure 7:
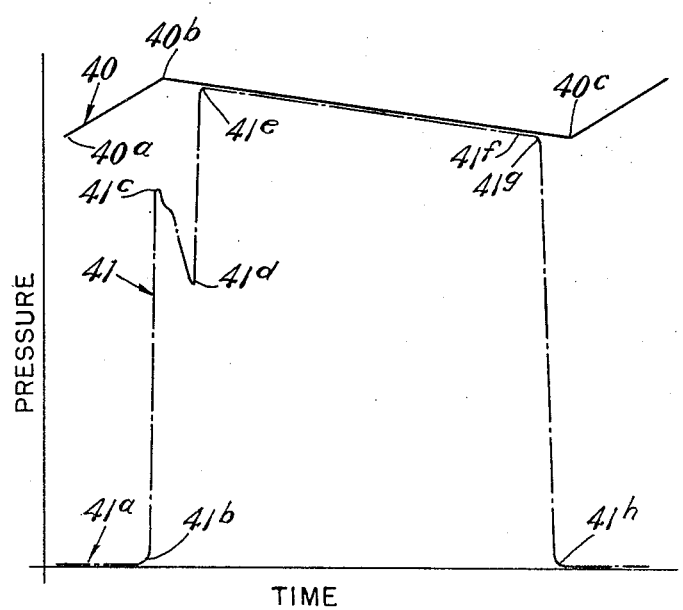
Fig. 7 is a graph illustrating the operation of the valve.

The operation of the system may be readily followed by means of the graph shown in Fig. 7, in which the curve 40 represents the pressure in the pressure line 17, and the curve 41 represents the pressure applied to the main valve actuating piston 34.

The curve 40 shows the fluctuations of pressure in the pressure line 17 when fluid is being withdrawn from the pressure line at a rate less than the capacity of the pump 12. Beginning at point 40a on curve 40, the pump is supplying fluid to the pressure conduit and the pressure therein rises at a uniform rate to point 40b, at which pressure the valve functions as described to open the main poppet 20 and by-pass the pump discharge directly back to the reservoir. Thereafter the pressure in the pressure conduit 17 gradually drops to the point 40c, at which value the main poppet 20 is again closed, and the cycle repeats.

Referring now to curve 41, it will be observed that up to point 41b the pressure applied to the lower end of the piston 34 is zero because the lower end of the cylinder 19 is connected through the passages 32 and 25h, bore 25g, the passage 30c and the passage 21a, directly to the exhaust passage 21. At a point 41a, the auxiliary poppet 26a closes on the seat 30d and disconnects the lower end of the cylinder 19 from the exhaust passage 21. However, this does not change the pressure of the fluid trapped in the passages connected to the lower end of cylinder 19.

At point 41b the seat 25d is cracked away from the pilot poppet 26 and is thereafter moved rapidly into fully open position in the manner previously described, causing the pressure acting against the lower end of the piston 34 to rise rapidly to point 41c, at which pressure the force of the pressure fluid on the piston 34 is sufficient to begin to open the main poppet 20. After it once begins to open, the main poppet 20 opens rapidly, and the corresponding rapid movement of the piston 34 permits relatively rapid flow of fluid through the passage 25c, the passages 25h and the passage 32 into the lower end of the cylinder 19, causing a resulting pressure drop in the latter to the point 41d on the curve 41. Thereafter the pressure in cylinder 19 rises rapidly to the point 41e on curve 41 and then declines gradually with the pressure in the pressure conduit 17, as represented by that portion of the curve 40 between points 40b and 40c.

At a point 41f, the return movement of the piston element 25 in response to reduction of the system pressure reseats the seat 25d against the pilot poppet 26, but this causes no change in the pressure below the piston 34. At point 41g on curve 41, the system pressure has been reduced sufficiently to again permit the piston element 25 to resume its downward movement, opening the auxiliary poppet 26a off the seat 30d, whereupon the piston element 25 is snapped into its lower position, permitting the pressure under piston 34 to drop rapidly to zero, as indicated at point 41h on curve 41, which results in the closing of the main poppet 20.

It is particularly to be noted that if the bore 28 were of the same diameter as the bore 24, the opening of the auxiliary poppet 26a off the seat 30d would not change the pressure forces acting on the piston element 25 in opposition to the spring 29, and the piston would not be snapped into its lower position following cracking of the auxiliary poppet 26a away from its seat 30d. Instead, the auxiliary poppet 26a would be moved very gradually away from the seat 30d, resulting in gradual discharge of fluid from the lower end of the cylinder 19 and resultant sluggish closing action of the main poppet 20. Likewise, if the bores 24 and 28 were of the same diameter, the cracking of the seat 25d away from the pilot poppet 26 would not change the pressure forces acting on the piston element 25, and the latter would admit fluid only very gradually to the lower end of the cylinder 19, resulting in sluggish opening movement of the main poppet 20.

It is also to be noted that pressure fluid in the bore 25g acts against the shoulder 25k at the lower end of that bore in direction to oppose opening movement of the piston element 25. However, the valve is so proportioned that the area of the shoulder 25k is substantially less than the differential area between the bores 24 and 28 respectively, so that the force of the pressure fluid acting against the shoulder 25i is greater than the force of the pressure fluid acting against the shoulder 25k.

It is desirable that the main poppet 20 open and close with fairly rapid movement in order to respond quickly to pressure changes in the system and maintain the system pressure within the desired limits.

Figs. 1 to 5 inclusive disclose a practical valve construction incorporating the features of the valve shown schematically in Fig. 6. Corresponding elements in Figs. 1 to 5 bear the same reference numerals as Fig. 6.

Referring to Figs. 1 to 5 inclusive, it will be observed that the valve housing comprises: a body 50 having an upper end closure cap 51 and a lower end closure cap 52, both of which caps are secured to the body 50 by screws 53 and 54. The upper end closure cap 51 functions to close the upper ends of bores 55 and 28. Bore 55 functions as a guide for the main poppet 20 and contains a restoring spring 20a for the poppet 20. A sealing ring 57 is provided to effect a fluid seal between the bore 55 and the upper end cap 51.

Figure 3:
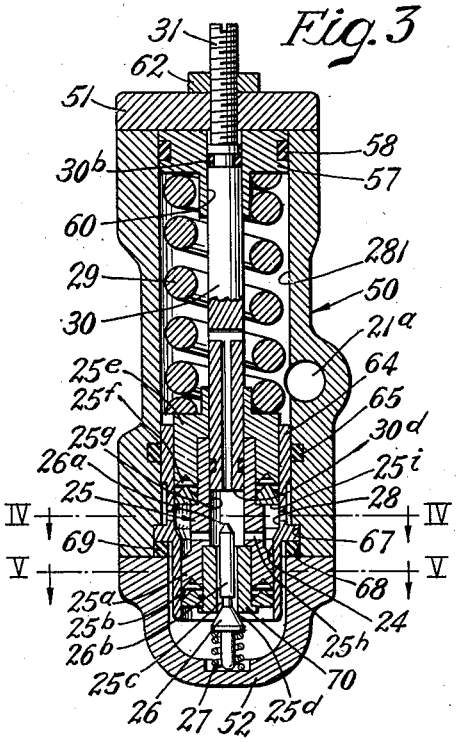
Fig. 3 is a vertical section taken in the plane III—III of Fig. 1.
Figure 5:
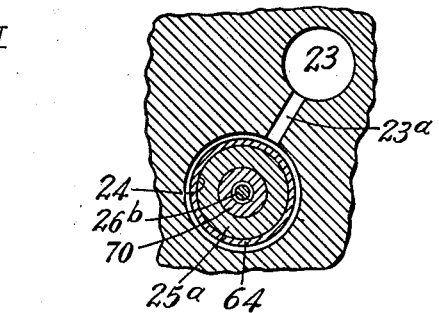
Fig. 5 is a horizontal section taken in the plane V—V of Fig. 3.

The bore 28 (Fig. 3) has been described with reference to Fig. 6. As shown in Fig. 3 the upper end of this bore is sealed by a plug 57 having a sealing ring 58, the plug being retained against the sealing cap 51 by the loading spring 29. The plug 57 has a bore 60 which guides the stem 30, the latter being sealed with respect to the bore 60 by the sealing ring 30b. The adjusting screw 31 is threaded through the end cap 51 and may be locked in a desired position of adjustment by a lock nut 62.

The screw 31 provides for adjustment, within limits, of the pressures at which the valve operates, by varying the vertical position of the seat 30d in the lower end of stem 30. Obviously if the stem 30 is lowered, the auxiliary poppet 26a will contact the seat 30d at a lower system pressure.

To facilitate manufacture, the bores 24 and 28 (Fig. 3) are formed in a tubular insert 64 separate from the body 50. Thus the bore 28l in the body 50 is of uniform diameter throughout except at the lower end of the body 50 where it is counterbored. The tubular insert 64 is fitted at its upper end into the bore 28l and sealed with respect thereto by a sealing ring 65. Intermediate its ends, the insert 64 is provided with an outwardly extending flange 67 which extends into the counterbore 68 at the lower end of bore 28l and is held against the shoulder of the counter bore by a sealing ring 69, which is pressed against the flange 67 by the lower end cap 52.

The piston element 25 is also preferably made in two parts, one of which forms the lower head 25a and the other of which forms the upper head 25e. The head element 25a also preferably has a separate tubular seat element 70 which is inserted in the head 25a and sealed with respect thereto by the same chevron-type seal 25b that effects the seal between the piston head 25a and the bore 24. The chevron-type seal 25f, which effects a seal between the piston head 25e and the bore 28, also effects a seal between the separate head portion 25e and the main part of the piston 25.

It will be obvious from inspection of Fig. 3 that by removing the lower end cap 52, the tubular element 64 and all of its associated parts can be removed as a unit.

Figure 1:
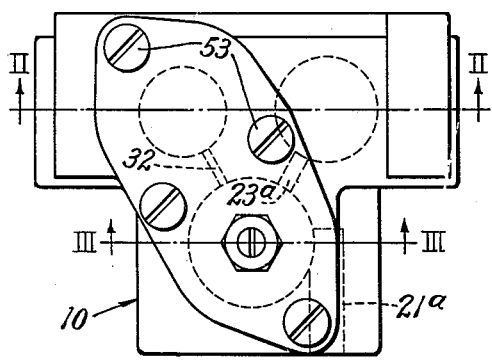
Fig. 1 is a plan view of a pressure regulator valve incorporating a pilot valve in accordance with the invention.
Figure 2:
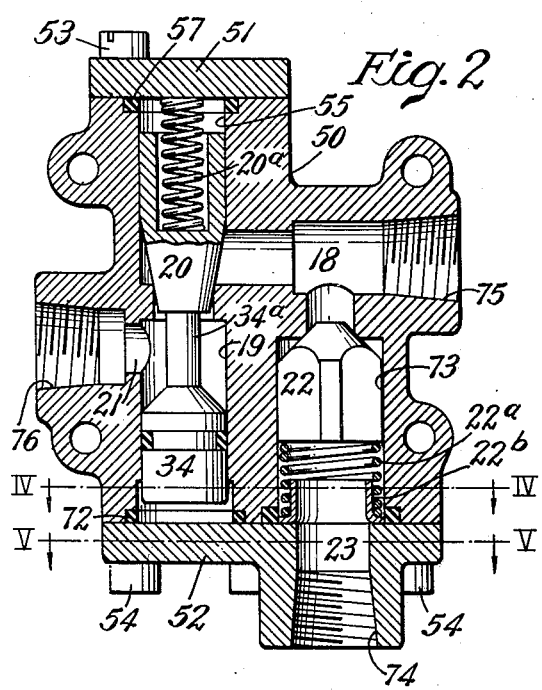
Fig. 2 is a vertical sectional view taken in the plane II—II of Fig. 1.
Figure 4:
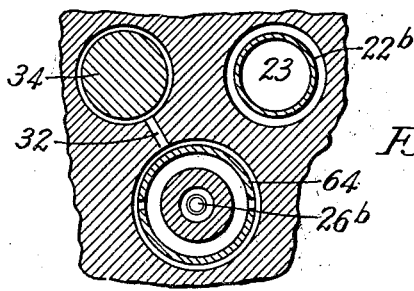
Fig. 4 is a horizontal section taken in the plane IV—IV of Fig. 2.

Referring to Fig. 2, the main portion of the cylinder 19 is formed in the body 50, and the lower end of the cylinder is constituted by the lower end cap 52, which is sealed with respect to the cylinder 19 by a sealing ring 72. Likewise, the chamber for the check valve poppet 22 is formed by a bore 73 in the body 50, which bore is in direct communication at its lower end with the passage 23, which is formed in the end cap 52. The passage 23 terminates in a threaded port 74, which is adapted to be connected to the pressure line 17 of Fig. 6. The pump output passage 18 is formed directly in the body 50 and terminates in a threaded port 75 adapted to be connected to the pump output conduit 15 of Fig. 6. The exhaust passage 21 is likewise formed directly in the body 50 and terminates in a threaded port 76 adapted to be connected to the exhaust conduit 16 of Fig. 6.

It will be apparent that when the lower end cap 52 is removed, the piston 34 with its integral stem 34a can be removed from the cylinder 19, and likewise the check valve poppet 22 and its spring 22b can be removed from the bore 73. It is also obvious that when the upper end cap 51 is removed, the main poppet 20 and its spring 20a can be removed (Fig. 2) and the filler block 57 and the spring 29 (Fig. 3) can be removed.

Although considerable variation in the relative diameters of the bores 24 and 28 can be tolerated, I found that a desirable snap action on closing and opening movements of the piston element 25 are obtained in a valve having the following dimensions:

| | Inch |
|---|---|
| Diameter of bore 24 | .75 |
| Diameter of bore 28 | .812 |
| Diameter of bore 25g | .281 |
| Diameter of piston passage 25c | .130 |

It will be understood that some special situations may make it desirable to have faster valve action, in which case the bore 28 can be made larger relative to the bore 24, or the shoulder 25k can be made smaller. On the other hand, if less rapid action is desirable, there should be less difference between the diameters of the bores 24 and 28, or the shoulder 25k should be larger.

It will be noted that the passage through the bore 25c around the poppet stem 26b offers more resistance to fluid flow than do the passages 25h. This is desirable because the passage around the stem 26b restricts only the flow of pressure fluid from the passage 23a into the bore 25g, and does not restrict the flow of exhaust fluid. If the passages 25h were restricted, they would not only offer resistance to flow of pressure fluid from the bore 25g into the bore 28, but would also offer resistance to the exhaust of fluid from the bore 28 to the bore 25g. Some restriction to flow of pressure fluid past the poppet stem 26b is desirable to prevent too rapid opening of the main valve 20. On the other hand, it is desirable to permit relative free flow of exhaust fluid from the lower end of the cylinder 19 through the passage 32, the passages 25h, and the passage 30c in order to permit fairly rapid closing of the main valve 20.

As herein disclosed, the pilot valve, main poppet and check valve are all incorporated in a single valve body in order to make a compact assembly. However, it is not necessary that the main poppet 20 and its actuating piston and cylinder and the check valve 22 be incorporated in the same body with the pilot valve mechanism, and the prior Trautman Patent 2,320,763 referred to herein above discloses these elements as separate units. Where, in the claims, the pilot valve alone is claimed, the passages 21a, 32, and 23a of Fig. 6 are referred to respectively as a low pressure port, a control port, and a high pressure port respectively, to simplify the claims.

Although for the purpose of explaining the invention, one particular construction thereof has been described in detail, numerous departures from the exact construction shown can be made while still utilizing the advantages yielded by the invention, which is to be limited only to the extent set forth in the appended claims.

I claim:

1. In a hydraulically actuated device: means defining a stepped cylinder having a section of small diameter at one end and a section of large diameter at the other end; a stepped piston within said cylinder having a small head sealing in the small section of said cylinder, and having a large head sealing in the large section of said cylinder; a high pressure port connected to the small end of said cylinder and a low pressure port connected to the large end of said cylinder; spring means urging said piston toward the small end of said cylinder; said piston having a predetermined neutral position intermediate the ends of its operating stroke; valve means responsive to the position of said piston for connecting the inner end of said large section of said cylinder between said piston heads to said high pressure port in response to movement of said piston from said neutral position toward the large end of said cylinder, and for connecting the inner end of said large section of said cylinder between said piston heads to said low pressure port in response to movement of said piston from said neutral position toward the small end of said cylinder; whereby said piston is urged away from said neutral position in either direction with increased force when once started away from said neutral position by a variation in the relative pressures in said low and high pressure ports.

2. A device as described in claim 1 in which said valve means comprises: a passage extending axially through said piston; a stationary hollow stem extending into said piston passage from the large end of said piston in sealing relation therewith, said stem having a passage for communicating said piston passage with the large end of said cylinder beyond said piston; a valve adapted to close said piston passage at the small end of the piston, an auxiliary valve connected to said valve and adapted to close said stem passage; said valve closing said piston passage and said auxiliary valve closing said stem passage when said piston is in said neutral position.

3. A device as described in claim 1, having a control port connected to the inner end of said large section of said cylinder between said piston heads for supplying pressure fluid to, and venting pressure from a controlled device in renspose to movement of said piston in opposite directions from said neutral position.

4. In a hydraulically actuated device: means defining a stepped cylinder having a section of small diameter at one end and a section of large diameter at the other end; a stepped piston within said cylinder having a small head sealing in the small section of said cylinder and having a large head sealing in the large section of said cylinder, said piston having a passage extending axially therethrough; a stationary hollow stem extending into said piston passage from the large end of said piston, said stem having a stem passage communicating the piston passage at the end of the stem with the large end of said cylinder beyond said piston; a valve adapted to close said piston passage at the small end of the piston; an auxiliary valve connected to said valve and adapted to close said stem passage; a high pressure port connected to the small end of said cylinder beyond said piston, a low pressure port connected to the large end of said cylinder beyond said piston, and a control port connected to the inner end of the large section of said cylinder between said piston heads; spring means urging said piston toward the small end of said cylinder beyond said piston; said piston having a predetermined neutral position intermediate the ends of its operating stroke in which said valve closes said piston passage and said auxiliary valve closes said stem passage; said valve being responsive to the position of said piston for connecting the inner end of said large section of said cylinder between said piston heads to the outer end of the small section of the cylinder beyond said piston in response to movement of said piston from said neutral position toward the large end of said cylinder, and said auxiliary valve being responsive to the position of said piston for connecting the inner end of said large section of said cylinder between said piston heads to the large end of said cylinder beyond said piston in response to movement of said piston from said neutral position toward the small end of said cylinder; whereby said piston is moved rapidly away from said neutral position in either direction when once started away from the neutral position by variation in the relative pressures in said low and high pressure ports, and said control port is quickly connected to either said low pressure port or said high pressure port, according to the direction of movement of the piston.

5. In a hydraulically actuated device: piston means having first and second pressure areas, both responsive to pressure thereagainst for urging said piston means in one direction; spring means urging said piston means in the other direction; a high pressure port and means connecting it to said first piston area; said piston means having a predetermined neutral position intermediate the ends of its operating stroke; valve means responsive to the position of said piston means for admitting pressure fluid from said pressure port to said second piston area in response to movement of said piston means from said neutral position in said one direction; and valve means for venting pressure fluid from said second piston area in response to movement of said piston means from said neutral position in said other direction; whereby said piston means is moved rapidly away from said neutral position in either direction when once started away from the neutral position by variation in the pressure in said pressure port.

6. A device as described in claim 5 having a control port communicating with said second piston area for supplying pressure fluid to, and venting pressure fluid from a controlled device in response to movement of said piston means in opposite directions from said neutral position.

FREDERICK W. SCHNECK.

REFERENCES CITED

The following references are of record in the file of this patent:

UNITED STATES PATENTS

| Number | Name | Date |
| --- | --- | --- |
| 2,264,375 | Hill | Dec. 2, 1941 |
| 2,320,763 | Trautman | June 1, 1943 |
| 2,375,411 | Grant | May 8, 1945 |